(12) United States Patent
Lundgren et al.

(10) Patent No.: US 10,427,470 B2
(45) Date of Patent: Oct. 1, 2019

(54) TIRE TRACTION ELEMENT

(71) Applicant: Bridgestone Americas Tire Operations, LLC, Nashville, TN (US)

(72) Inventors: Paula R. Lundgren, Akron, OH (US); Zachary A. Sterba, Akron, OH (US); Andrew D. Anderson, Copley, OH (US)

(73) Assignee: Bridgestone Americal Tire Operations, LLC, Nashville, TN (US)

( * ) Notice: Subject to any disclaimer, the term of this patent is extended or adjusted under 35 U.S.C. 154(b) by 215 days.

(21) Appl. No.: 15/516,996

(22) PCT Filed: Sep. 8, 2015

(86) PCT No.: PCT/US2015/048949
§ 371 (c)(1),
(2) Date: Apr. 5, 2017

(87) PCT Pub. No.: WO2016/057149
PCT Pub. Date: Apr. 14, 2016

(65) Prior Publication Data
US 2017/0246914 A1 Aug. 31, 2017

Related U.S. Application Data

(60) Provisional application No. 62/060,211, filed on Oct. 6, 2014.

(51) Int. Cl.
*B60C 11/13* (2006.01)
*B60C 11/03* (2006.01)

(52) U.S. Cl.
CPC ...... *B60C 11/1323* (2013.01); *B60C 11/0309* (2013.01); *B60C 11/1376* (2013.01);
(Continued)

(58) Field of Classification Search
CPC .......... B60C 11/1307; B60C 2011/1338; B60C 11/1323
See application file for complete search history.

(56) References Cited

U.S. PATENT DOCUMENTS 5,456,301 A * 10/1995 Wise .................... B60C 11/0309
152/209.15
6,415,835 B1 7/2002 Heinen
(Continued)

FOREIGN PATENT DOCUMENTS

DE 102006031779 A1 1/2008
JP 05319022 A * 12/1993
(Continued)

OTHER PUBLICATIONS

Machine Translation: JP-2014084003-A; Kiwaki Koyo; (Year: 2019).*
(Continued)

*Primary Examiner* — Robert C Dye
*Assistant Examiner* — Kendra Ly
(74) *Attorney, Agent, or Firm* — Shaun J. Fox; Thomas Y. Kendrick

(57) ABSTRACT

Various embodiments of a tire traction element are provided. In one embodiment, a tire traction element is oriented in a circumferential groove of a tire to provide improved snow and/or mud traction. In one embodiment, a tire for a vehicle is provided, comprising: a tread having a circumferential direction, the tread having at least one circumferential groove which extends in the circumferential direction, the at least one circumferential groove having a groove base, and at least one groove sidewall; a plurality of traction elements in the circumferential groove connected to the at least one groove sidewall and the groove base; wherein at least one of the traction elements has a plurality of indentations formed on a radially outermost edge between the base portion and the at least one sidewall portion; and wherein the radially (Continued)

outermost edge has an angle of inclination θ relative to the radial direction.

12 Claims, 5 Drawing Sheets

(52) U.S. Cl.
CPC ........... *B60C 11/13* (2013.01); *B60C 11/1307* (2013.01); *B60C 11/1353* (2013.01); *B60C 2011/1338* (2013.01); *B60C 2011/1361* (2013.01)

(56) References Cited

U.S. PATENT DOCUMENTS

| | | | |
|---|---|---|---|
| 6,986,372 | B2 | 1/2006 | Below |
| 7,537,033 | B2 | 5/2009 | Yamane |
| 8,181,682 | B2 | 5/2012 | Miyazaki |
| 8,490,664 | B2 | 7/2013 | Behr et al. |
| 8,708,009 | B2 | 4/2014 | Ochi |
| 2003/0102064 | A1 | 6/2003 | Below |
| 2005/0126670 | A1* | 6/2005 | Godefroid ........... B60C 11/0309 152/209.22 |
| 2006/0016536 | A1 | 1/2006 | Maxwell et al. |
| 2007/0240801 | A1 | 10/2007 | Tanaka |
| 2008/0271827 | A1 | 11/2008 | Morrison et al. |
| 2009/0145529 | A1* | 6/2009 | Miyazaki ............ B60C 11/0309 152/209.21 |
| 2009/0320982 | A1 | 12/2009 | Ochi |
| 2013/0068359 | A1 | 3/2013 | Suita |

FOREIGN PATENT DOCUMENTS

| | | | | | |
|---|---|---|---|---|---|
| JP | 06183210 | A | | 7/1994 | |
| JP | 2865765 | B2 | | 3/1999 | |
| JP | 2000280711 | A | * | 10/2000 | |
| JP | 2003063213 | A | | 3/2003 | |
| JP | 2008012969 | A | | 1/2008 | |
| JP | 2008012969 | A | * | 1/2008 | |
| JP | 2008189251 | A | | 8/2008 | |
| JP | 2009046052 | A | | 3/2009 | |
| JP | 4488119 | B2 | | 6/2010 | |
| JP | 2012046105 | A | | 3/2012 | |
| JP | 2012180063 | A | | 9/2012 | |
| JP | 2012183944 | A | | 9/2012 | |
| JP | 2013039899 | A | | 2/2013 | |
| JP | 5278127 | B2 | | 9/2013 | |
| JP | 2013216118 | A | | 10/2013 | |
| JP | 2013244907 | A | | 12/2013 | |
| JP | 2014012485 | A | | 1/2014 | |
| JP | 2014084003 | A | * | 5/2014 | ......... B60C 11/0309 |
| KR | 20100065958 | A | | 6/2010 | |
| WO | 2008015904 | A1 | | 2/2008 | |

OTHER PUBLICATIONS

Machine Translation: JP-2008012969-A; Oizumi, Hisaya; (Year: 2019).*
Machine Translation: JP-2000280711-A; Miyoshi, Akihiro; (Year: 2019).*
Machine Translation: JP-05319022-A; Fukuoka, Toru; (Year: 2019).*
English translation of Abstract of DE102006031779A1.
Supplementary European Search Report, dated May 18, 2018, International Searching Authority, pp. 1-2.
English translation of Abstract of JP2012180063A.
English translation of Abstract of JP2014012485A.
English translation of Abstract of JP2003063213.
English translation of Abstract of JP2012046105.
English translation of Abstract of JP2008012969.
English translation of Abstract of JP2009046052.
English translation of Abstract of JP06183210.
English translation of Abstract of JP2012183944.
English translation of Abstract of JP2013039899.
English translation of Abstract of JP2013216118.
English translation of Abstract of JP2013244907.
English translation of Abstract of JP2865765.
English translation of Abstract of JP4488119.
English translation of Abstract of JP5278127.
International Search Report and Written Opinion, dated Dec. 17, 2015, for International Pat. App. No. PCT/US2015/048949, international filing date of Sep. 8, 2015.
English translation of abstract of JP2008189251.

* cited by examiner

TIRE TRACTION ELEMENT

CROSS-REFERENCE TO RELATED APPLICATIONS

This application claims priority to International Patent Application No. PCT/US2015/048949, titled "Tire Traction Element" and filed on Sept. 8, 2015, which claims priority to U.S. Provisional Application No. 62/060,211, titled "Tire Traction Element" and filed on Oct. 6, 2014, each of which is expressly incorporated by reference herein in its entirety.

BACKGROUND

Vehicle tires may be operated in any of a variety of conditions. For example, a vehicle tire may be operated in wet conditions (e.g., a wet roadway), snowy conditions (e.g., a snow-covered roadway or a snow-covered off-road landscape), muddy conditions (e.g., wet or loose soil in an off-road landscape), and the like. Vehicle tires intended for such applications typically include a tread portion having a tread pattern. Tread patterns often include a complex system of elements intended to optimize tire performance across a variety of operating conditions. For example, tires intended for operation in wet conditions typically include circumferential grooves extending about the circumference of the tire to assist in evacuation of water from the tire footprint area during operation. In another example, tires intended for operation in snowy conditions may include a higher concentration of edges to trap snow.

It is understood that a tire operating in snowy conditions typically experiences increased traction when the tire traps snow within the tread pattern. That is, it is understood that snow-on-snow contact typically exhibits greater friction forces than rubber-on-snow contact. It is understood that mud-on-mud contact likewise typically exhibits greater friction forces than rubber-on-mud contact.

As such, where a tread pattern includes circumferential grooves, it may be beneficial to trap snow and/or mud in at least a portion of the circumferential groove, which snow and/or mud has increased friction forces at its interface with the free snow and/or mud on the running surface, that is traveling along the circumferential groove during tire operation. As a result, the tread pattern as a whole may have increased traction in snowy and/or muddy conditions.

What is needed is a tire having a traction element configured to trap snow and/or mud in the tread pattern.

SUMMARY

In one embodiment, a tire for a vehicle is provided, the tire comprising: a tread having a circumferential direction, an axial direction, and a radial direction, the tread having at least one circumferential groove which extends in the circumferential direction, the at least one circumferential groove having a groove base, and at least one groove sidewall; a plurality of traction elements in the circumferential groove connected to the at least one groove sidewall and the groove base; wherein at least one of the traction elements has a plurality of indentations formed on a radially outermost edge between the base portion and the at least one sidewall portion; and wherein the radially outermost edge has an angle of inclination θ relative to the radial direction.

In another embodiment, a tire for a vehicle is provided, the tire comprising: a tread having a circumferential direction, an axial direction, and a radial direction, the tread having at least one circumferential groove which extends in the circumferential direction, the at least one circumferential groove having a groove base, and at least one groove sidewall; a plurality of traction elements in the circumferential groove connected to the at least one groove sidewall and the groove base; wherein at least one of the traction elements has at least one indentation formed on a radially outermost edge between the base portion and the at least one sidewall portion; wherein the radially outermost edge has a length L; wherein the at least one indentation has a length Li that is between about 0.2 and about 0.8 times the length L; and wherein the radially outermost edge has an angle of inclination θ relative to the radial direction.

In another embodiment, a tire for a vehicle is provided, the tire comprising: a tread having a circumferential direction, an axial direction, and a radial direction, the tread having two axially outer shoulder portions, at least one of the shoulder portions having a shoulder sidewall which extends at least partially in the radial direction; a plurality of traction elements on at least one of the shoulder portions, wherein the traction elements are connected to the shoulder sidewall; and wherein at least one of the traction elements has at least one concave section formed on a radially outermost edge of the traction element.

BRIEF DESCRIPTION OF THE DRAWINGS

The accompanying figures, which are incorporated in and constitute a part of the specification, illustrate various example systems and apparatuses, and are used merely to illustrate various example embodiments. In the figures, like elements bear like reference numerals.

DETAILED DESCRIPTION

Figure 1:
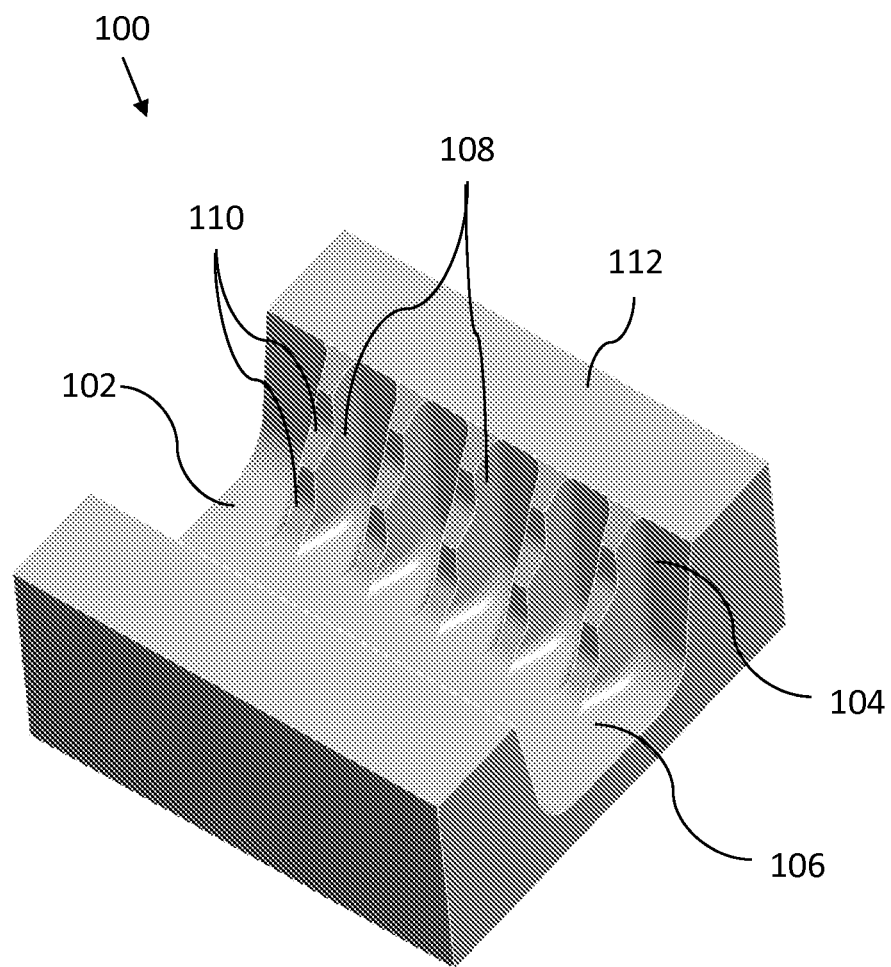
FIG. 1 illustrates a perspective view of a portion of a tire tread 100 including at least one traction element.

FIG. 1 illustrates a perspective view of a portion of a tire tread 100 including at least one traction element 108. Tire tread 100 may include a groove 102. Groove 102 may include at least one groove sidewall 104 and a groove base 106. Groove 102 may include at least one traction element 108. At least one traction element 108 may include at least one indentation 110. Tread 100 may include a running surface 112.

Tire tread 100 may be utilized on any of a variety of tires, including for example pneumatic tires, non-pneumatic tires, truck and bus radial tires, light truck tires, passenger tires, off-the-road tires, agricultural tires, and the like. Tire tread 100 may be a directional tread, or a non-directional tread. Tread 100 may have a circumferential direction, a radial direction, and an axial direction.

Groove 102 may be any groove in a tread pattern. Groove 102 may be a circumferential groove. Groove 102 may be a transverse groove. Groove 102 may be inclined at an angle relative to a tire centerline. Groove 102 may be parallel to the tire centerline. Groove 102 may be a continuous circumferential groove. Groove 102 may be a discontinuous circumferential groove. Groove 102 may be a zig-zag groove. Groove 102 may be a zig-zag groove that zig-zags back and forth with a period of between about 20.0 mm and about 150.0 mm. Groove 102 may be a zig-zag groove that zig-zags back and forth with a period of less than about 20.0 mm. Groove 102 may be a zig-zag groove that zig-zags back and forth with a period of more than about 150.0 mm.

At least one traction element 108 may extend between, and be connected to, at least one groove sidewall 104 and groove base 106. At least one traction element 108 may be inclined at an angle relative to the radial axis of tread 100. At least one traction element 108 may comprise a plurality of traction elements 108. A plurality of traction elements 108 may be oriented only along a first groove sidewall 104. A plurality of traction elements 108 may be oriented in sets of any number, alternating between a first groove sidewall 104 and a second groove sidewall 104. A plurality of traction elements 108 may alternate between a first groove sidewall 104 and a second groove sidewall 104.

At least one traction element 108 may extend only from groove base 106 and may not connect to at least one groove sidewall 104. At least one traction element 108 may extend only from at least one groove sidewall 104 and may not connect to groove base 106.

At least one traction element 108 may include at least one edge. For example, traction element 108 may include an edge that is a radially outward portions of traction element 108. The edge may be the radially outward portion of traction element 108 that extends from groove sidewall 104 to groove base 106.

Traction element 108 may include at least one indentation 110. At least one indentation 110 may be oriented on the edge of traction element 108. Traction element 108 may include two indentations 110. Traction element 108 may include three indentations 110. Traction element 108 may include any number of indentations 110. Indentations 110 may be substantially concave. Indentations 110 may be configured to increase the surface area of the edge of traction element 108, thus allowing traction element 108 more surface area in which to trap snow or mud.

At least one indentation 110 may be substantially circular. At least one indentation 110 may be substantially arcuate. At least one indentation 110 may be substantially curvilinear. At least one indentation 110 may be "v-shaped." At least one indentation 110 may create a sawtooth pattern. At least one indentation 110 may take on any concave shape.

Figure 2:
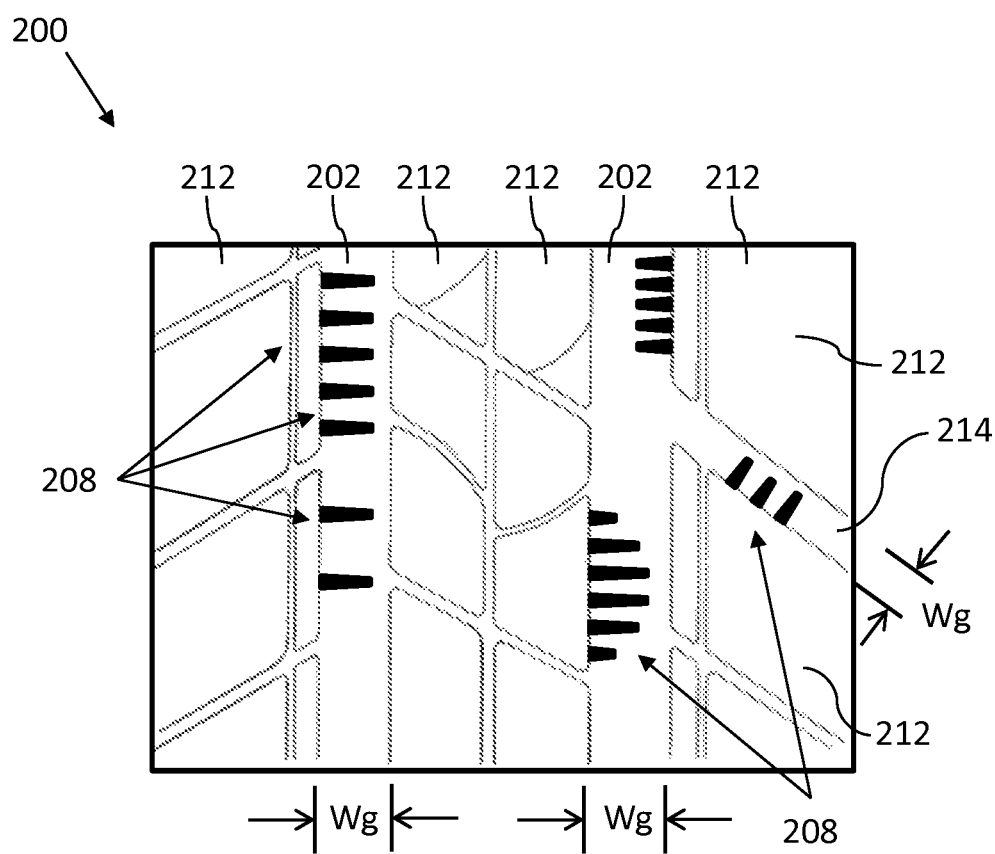
FIG. 2 illustrates a plan view of an example arrangement of a tire tread 200 including at least one traction element.

FIG. 2 illustrates a plan view of an example arrangement of a tire tread 200 including at least one traction element 208. Tread 200 may include at least one circumferential groove 202. Tread 200 may include a running surface 212. Tread 200 may include at least one inclined groove 214. Each of circumferential grooves 202 and inclined grooves 214 may include a groove width Wg.

As illustrated, at least one traction element 208 may be oriented in any of a variety of manners, including sets of more closely spaced traction elements 208, sets of more widely spaced traction elements 208, sets of shorter (e.g., extending into grooves 202, 214 less) traction elements 208, sets of longer (e.g., extending into grooves 202, 214 more) traction elements 208, sets of traction elements 208 wherein the traction elements 208 have varying widths (e.g., extending into grooves 202, 214 more or less than neighboring elements 208), and the like. It is contemplated that traction elements 208 may have any of a variety of spacings and patterns as necessary to adequately retain snow and/or mud within tread 200 so as to result in increased traction.

Figure 3:
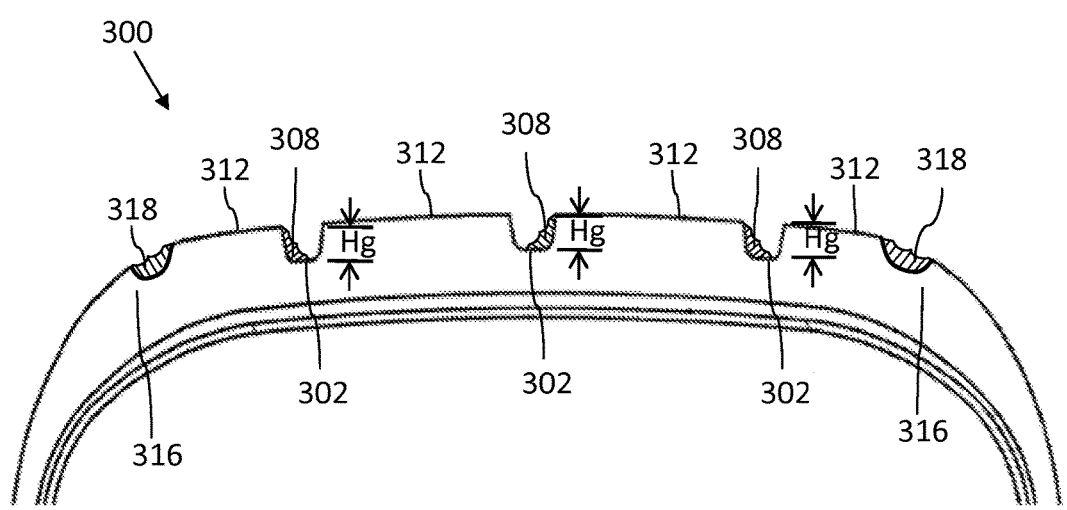
FIG. 3 illustrates a sectional view of an example arrangement of a tire tread 300 including at least one traction element.

FIG. 3 illustrates a sectional view of an example arrangement of a tire tread 300 including at least one traction element 308. Tread 300 may include at least one circumferential groove 302. At least one traction element 308 may be oriented in at least one circumferential groove 302. Tread 300 may include a running surface 312. Each of circumferential grooves 302 may have a groove height Hg.

Tread 300 may have at least one shoulder portion 316. Tread 300 may have two shoulder portions 316, each oriented on axially outermost portions of tread 300. The shoulder portions 316 may contain at least one traction element 318. Traction element 318 may be substantially similar to traction elements 108, 208, and 308 described herein. The at least one shoulder portion 316 may include a shoulder sidewall. Traction element 318 may extend from the shoulder sidewall. The shoulder sidewall may extend at least partially in the radial direction.

Figure 4A:
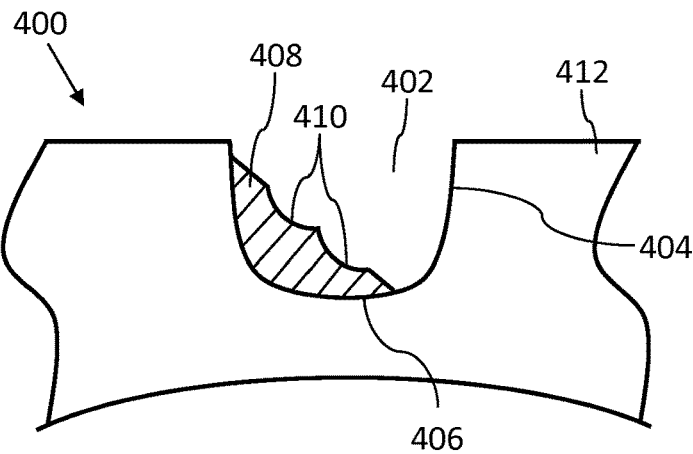
FIG. 4A illustrates a partial sectional view of an example arrangement of a tire tread 400 including at least one traction element.

FIG. 4A illustrates a partial sectional view of an example arrangement of a tire tread 400 including at least one traction element 408. Tread 400 may include at least one groove 402. At least one groove 402 may include at least one groove sidewall 404 and a groove base 406. At least one traction element 408 may include at least one indentation 410. Tread 400 may include a running surface 412.

At least one traction element 408 may include two indentations 410. At least one traction element 408 may include a single indentation 410. At least one traction element 408 may include three indentations 410. At least one traction element 408 may include more than two indentations 410. At least one traction element 408 may include more than three indentations 410.

Figure 4B:
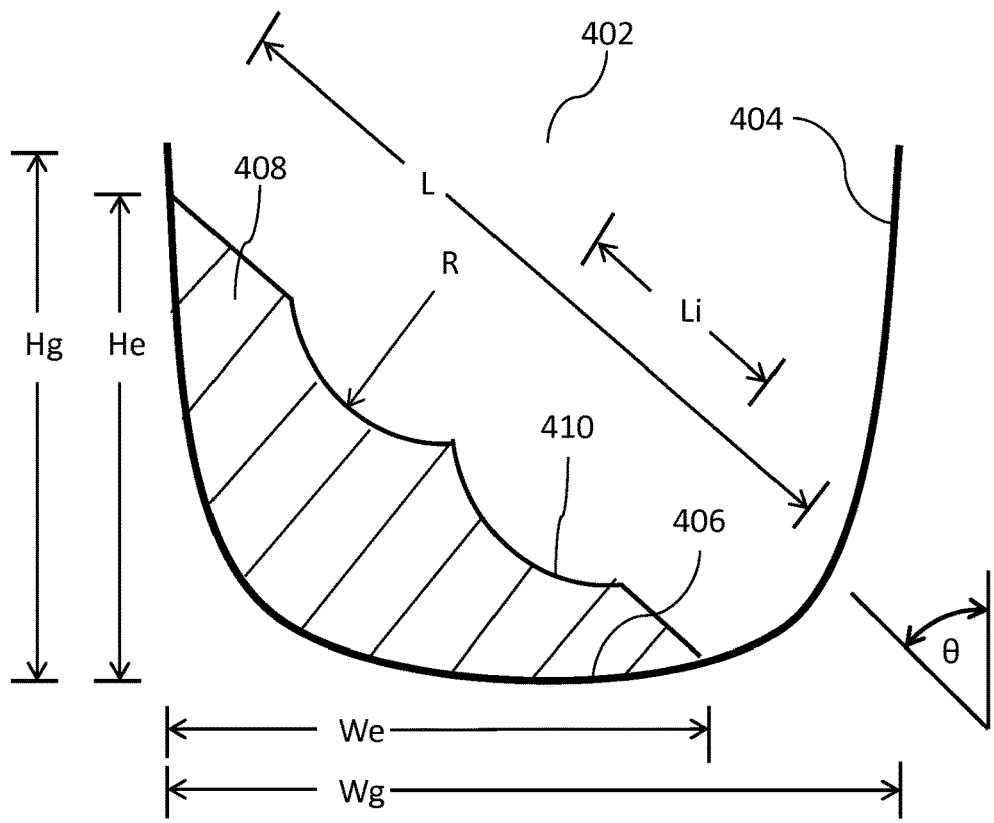
FIG. 4B illustrates a partial sectional view of tire traction element 408.

FIG. 4B illustrates a partial sectional view of tire traction element 408. Each indentation 410 may be arcuate in shape and may have a radius R. Each indentation 410 may be curvilinear in shape. Radius R may any of a variety of radii, including for example a radius between about 1.0 mm and about 3.0 mm. Radius R may be between about 0.0 mm and about 3.0 mm. Radius R may be between about 0.1 mm and about 3.0 mm. In one embodiment, radius R may be between about 1.0 mm and about 10.0 mm. Radius R may be between about 0.0 mm and about 10.0 mm. Radius R may be between about 0.1 mm and about 10.0 mm. Radius R may be larger for larger tires, including for example off-the-road tires. Radius R may be about 2.5 mm Radius R may be about 2.0 mm. Radius R may be less than 1.0 mm. Radius R may be greater than 3.0 mm. Radius R may be greater than 10.0 mm. Radius R may have a value between any of the ranges recited herein.

Traction element 408 may have a length L. Length L may be the diagonal length of the radially outermost edge of traction element 408. Length L may have any of a variety of values. Length L may be at least the width of groove, Wg. Length L may be less than the width of groove, Wg. Length L may be greater than the width of groove, Wg. Length L may be at least the height of groove, Hg. Length L may be less than the height of groove, Hg. Length L may be greater than the height of groove, Hg.

At least one indentation 410 may have a length Li. Length Li may be between about 0.2 and about 0.8 times length L. Length Li may be less than about 0.2 times length L. Length Li may be about 1.0 times length L. Length Li may be greater than 1.0 times length L. Length Li may be between about 0.3 and about 0.6 times length L. Length Li may be between about 0.2 and about 0.5 times length L. Length Li may be any value within any of the ranges recited herein.

Length Li may be within a range having any of the upper and lower limits of ranges recited herein.

The radially outermost edge of traction element 408, between groove sidewall 404 and groove base 406, may be inclined at an angle θ relative to the radial direction. Angle θ may be any of a variety of angles, including for example any angle between about 0.0 degrees and 90.0 degrees. In one embodiment, angle θ may be between about 30.0 degrees and 60.0 degrees. Angle θ may be about 45.7 degrees. Angle θ may be about 52.1 degrees. Angle θ may be about 60.0 degrees. Angle θ may be about 66.0 degrees. Angle θ may be about 69.8 degrees. Angle θ may be between about 45.0 degrees and about 70.0 degrees. Angle θ may be between about 30.0 degrees and about 70.0 degrees. Angle θ may be any value within any of the ranges recited herein. Angle θ may be within a range having any of the upper and lower limits of ranges or specific values recited herein.

At least one traction element 408 may have a width We. Width We may be defined as a percentage of groove width Wg. Width We may be between about 50% and about 100% of groove width Wg. Width We may be between about 30% and 75% of groove width Wg. Width We may be between about 30% and about 100% of groove width Wg. Width We may be between about 0% and about 100% of groove width Wg. Width We may be less than about 30% of groove width Wg. Width We may be about 40% of groove width Wg. Width We may be about 59% of groove width Wg. Width We may be about 50% of groove width Wg. Width We may be between about 40% and about 59% of groove width Wg. Width We may be any value within any of the ranges recited herein. Width We may be within a range having any of the upper and lower limits of ranges or specific values recited herein.

At least one traction element 408 may have a height He. Height He may be defined as a percentage of groove height Hg. Height He may be between about 50% and about 100% of groove height Hg. Height He may be between about 60% and 90% of groove height Hg. Height He may be between about 70% and about 85% of groove height Hg. Height He may be less than about 50% of groove height Hg. Height He may be about 100% of groove height Hg. Height He may be any value within any of the ranges recited herein. Height He may be within a range having any of the upper and lower limits of ranges or specific values recited herein.

Figure 4C:
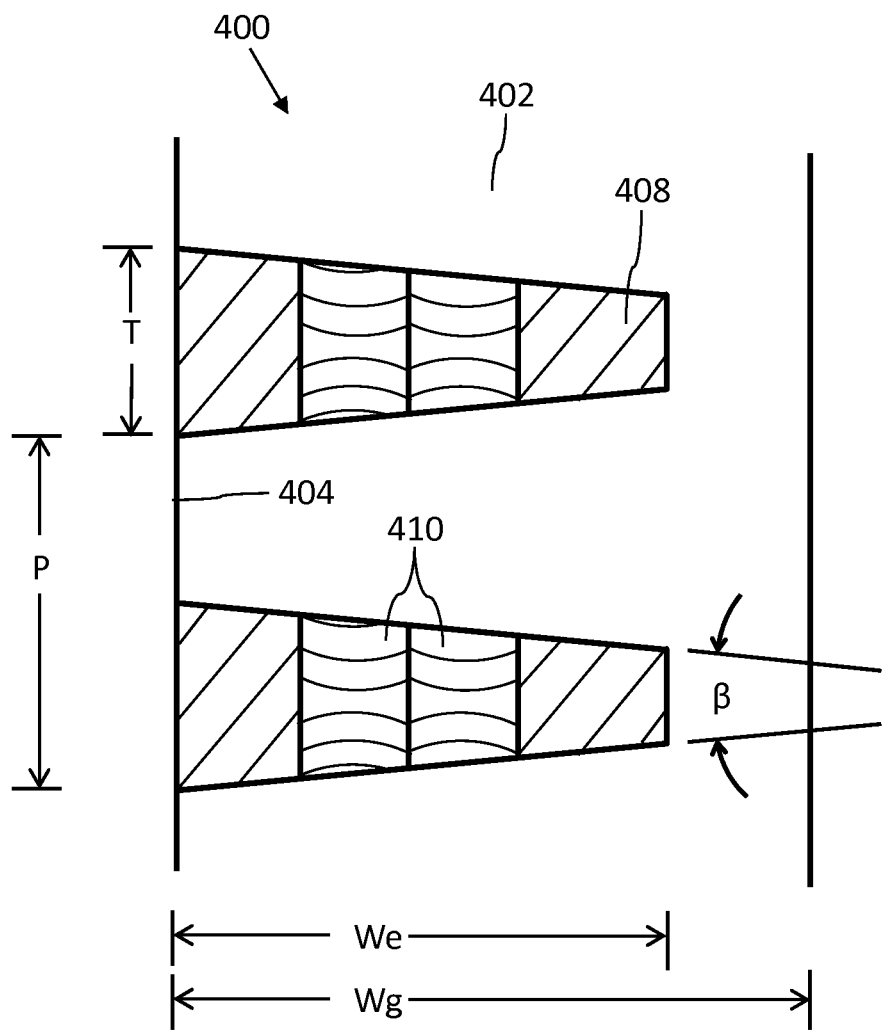
FIG. 4C illustrates a partial plan view of an example arrangement of tire tread 400 including at least one traction element.

FIG. 4C illustrates a partial plan view of an example arrangement of tire tread 400 including at least one traction element 408.

At least one traction element 408 may have a thickness T. Thickness T may be measured at the point of at least one traction element 408 where at least one traction element 408 contacts groove sidewall 404. Thickness T may have any of a variety of values. In one embodiment, thickness T may be between about 1.0 mm and about 6.0 mm. Thickness T may be between about 2.0 mm and about 4.0 mm. Thickness T may be less than 1.0 mm or greater than 6.0 mm. Thickness T may be about 3.5 mm. Thickness T may be about 4.0 mm. Thickness T may be about 7.0 mm. Thickness T may be greater than about 7.0 mm. Thickness T may be between about 3.5 mm and about 7.0 mm. Thickness T may have any value within the ranges or specific values recited herein.

At least one traction element 408 may comprise a plurality of traction elements 408. The plurality of traction elements 408 may be oriented at a pitch P. Pitch P may be any of a variety of values. In one embodiment, pitch P may be between one time and ten times thickness T. Pitch P may be greater than ten times thickness T. Pitch P may be about 11.6 mm. Pitch P may be about 8.4 mm. Pitch P may be between about 8.0 mm and about 12.0 mm. Pitch P may have any value within the ranges or specific values recited herein. Pitch P may be between about 75% and about 150% of groove height Hg. Pitch P may be between about 50% and about 200% of groove height Hg.

At least one traction element 408 may be tapered in nature, such that its thickness at groove sidewall 404 is greater than its thickness at its distal end. The opposing sides of traction element 408 may have an angle β relative one another. Angle β may be between about 0 degrees and about 90 degrees. Angle β may be between about 5 degrees and about 10 degrees. Angle β may be about 37 degrees. Angle β may be about 43 degrees. Angle β may be between about 35 degrees and about 45 degrees. Angle β may be any value within any of the ranges recited herein. Angle β may be within a range having any of the upper and lower limits of ranges or specific values recited herein.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A tire for a vehicle comprising:
    a tread having a circumferential direction, an axial direction, and a radial direction,
    the tread having at least one circumferential groove which extends in the circumferential direction, the at least one circumferential groove having a groove base, and at least one groove sidewall;

a plurality of traction elements in the circumferential groove connected to the at least one groove sidewall and the groove base;

wherein at least one of the traction elements has at least two indentations found on a radially outermost edge between the groove base and only one groove sidewall of the at least one groove sidewall;

wherein the at least two indentations each have a bottom surface which is arcuate in shape and has a radius R; and wherein the radially outermost edge has an angle of inclination relative to the radial direction.

2. The tire of claim 1, wherein the angle of inclination θ relative to the radial direction is between about 45 degrees and about 70 degrees.

3. The tire of claim 1, wherein the at least one circumferential groove has a groove width Wg, wherein at least one of the traction elements has a width We, and wherein the width We is between about 30% and about 100% of the groove width Wg.

4. The tire of claim 1, wherein the at least one circumferential groove has a groove height Hg, wherein at least one of the traction elements has a height He, and wherein the height He is between about 50% and about 100% of the groove height Hg.

5. The tire of claim 4, wherein at least two of the traction elements are oriented at a pitch P, wherein the pitch P is between about 50% and about 200% of the groove height He.

6. The tire of claim 1, wherein the plurality of traction elements have a circumferential thickness, and wherein the plurality of traction elements are tapered such that the thickness of each traction element at the groove sidewall is greater than the thickness of each traction element at its distal end.

7. A tire for a vehicle comprising:

a tread having a circumferential direction, an axial direction, and a radial direction, the tread having at least one circumferential groove which extends in the circumferential direction, the at least one circumferential groove having a groove base, and at least one groove sidewall;

a plurality of traction elements in the circumferential groove connected to the at least one groove sidewall and the groove base;

wherein at least one of the traction elements has at least two indentations formed on a radially outermost edge between the groove base and only one groove sidewall of the at least one groove sidewall;

wherein the at least two indentations each have a bottom surface which is arcuate in shape and has a radius R;

wherein the radially outermost edge has a length L;

wherein the at least two indentations has a length Li that is between about 0.2 and about 0.8 times the length L; and wherein the radially outermost edge has an angle of inclination θ relative to the radial direction.

8. The tire of claim 7, wherein the angle of inclination θ relative to the radial direction is between about 45 degrees and about 70 degrees.

9. The tire of claim 7, wherein the at least one circumferential groove has a groove width Wg, wherein at least one of the traction elements bas a width We, and wherein the width We is between about 30% and about 100% of the groove width Wg.

10. The tire of claim 7, wherein the at least one circumferential groove has a groove height Hg, wherein at least one of the traction elements has a height He, and wherein the height He is between about 50% and about 100% of the groove height Hg.

11. The tire of claim 10, wherein at least two of the traction elements are oriented at a pitch P, wherein the pitch P is between about 50% and about 200% of the groove height Hg.

12. The tire of claim 7, wherein the plurality of traction elements have a circumferential thickness, and wherein the plurality of traction elements are tapered such that the thickness of each traction element at the groove sidewall is greater than the thickness of each traction element at its distal end.

* * * * *